(12) United States Patent
Wang et al.

(10) Patent No.: US 12,717,667 B2
(45) Date of Patent: Aug. 25, 2026

(54) SAMPLE MESSAGE PROCESSING METHOD AND APPARATUS

(71) Applicant: TravelSky Technology Limited, Beijing (CN)

(72) Inventors: Yingtong Wang, Beijing (CN); Lejian Lin, Beijing (CN); Weiwei Sun, Beijing (CN); Jie Guo, Beijing (CN); Ting Zhao, Beijing (CN)

(73) Assignee: TravelSky Technology Limited, Beijing (CN)

( * ) Notice: Subject to any disclaimer, the term of this patent is extended or adjusted under 35 U.S.C. 154(b) by 475 days.

(21) Appl. No.: 18/272,561

(22) PCT Filed: Nov. 19, 2021

(86) PCT No.: PCT/CN2021/131669

§ 371 (c)(1),
(2) Date: Jul. 14, 2023

(87) PCT Pub. No.: WO2022/151835

PCT Pub. Date: Jul. 21, 2022

(65) Prior Publication Data

US 2024/0195860 A1 Jun. 13, 2024

(30) Foreign Application Priority Data

Jan. 18, 2021 (CN) ........................ 202110062659.X

(51) Int. Cl.

| | |
|---|---|
| ***G06F 9/54*** | (2006.01) |
| ***G06F 11/34*** | (2006.01) |
| ***H04L 69/22*** | (2022.01) |

(52) U.S. Cl.

CPC .......... *G06F 9/547* (2013.01); *G06F 11/3476* (2013.01); *H04L 69/22* (2013.01)

(58) Field of Classification Search

CPC ...... G06F 9/547; G06F 11/3476; H04L 69/22; H04L 67/02; Y02D 10/00

See application file for complete search history.

(56) References Cited

U.S. PATENT DOCUMENTS

| | | | | |
|---|---|---|---|---|
| 6,148,329 | A * | 11/2000 | Meyer | H04L 51/56 709/206 |
| 9,760,384 | B1 * | 9/2017 | Chauhan | G06F 9/545 |

(Continued)

FOREIGN PATENT DOCUMENTS

| | | | |
|---|---|---|---|
| CN | 107317811 | A | 11/2017 |
| CN | 107528839 | A | 12/2017 |

(Continued)

OTHER PUBLICATIONS

Extended European Search Report for European Application No. 21919026.1, dated Nov. 25, 2024.

(Continued)

*Primary Examiner* — Kevin L Young
*Assistant Examiner* — Jennifer Marie Gutman
(74) *Attorney, Agent, or Firm* — Wolf, Greenfield & Sacks, P.C.

(57) ABSTRACT

A sample message processing method and apparatus. The method includes: acquiring interface data generated during a process of performing data interaction by means of an interface; determining additional data corresponding to the interface data; on the basis of the additional data, generating identification data corresponding to the interface data; if the identification data matches historical identification data, determining a request message and a response message, which correspond to message version data, as a historical sample message pair; and if the identification data does not match the historical identification data, determining the request message and the response message, which correspond to the message version data, as a new sample message (Continued)

pair, such that a sample message pair can be formed on the basis of the interface data.

6 Claims, 5 Drawing Sheets

(56) References Cited

U.S. PATENT DOCUMENTS 10,019,255 B1 * 7/2018 Greenfield .......... G06F 11/1433
2008/0091837 A1 * 4/2008 Langen ............... H04L 65/1104 709/230
2012/0011496 A1 * 1/2012 Shimamura ......... G06F 9/44521 717/170
2013/0179489 A1 * 7/2013 Daley ..................... H04L 67/02 709/203
2015/0006641 A1 * 1/2015 Murugesan ........... H04L 51/216 709/206
2015/0227406 A1 * 8/2015 Jan ...................... G06F 11/0709 714/37
2016/0014002 A1 * 1/2016 Bellis .................. H04L 43/0876 709/224
2017/0364369 A1 * 12/2017 Wells .................. G06F 16/2423
2018/0196707 A1 7/2018 Gaha Tchamabe et al.
2019/0037005 A1 * 1/2019 Palladino .................. G06F 8/73
2019/0196842 A1 * 6/2019 Horikoshi ............. G06F 9/5055
2019/0381985 A1 12/2019 Vashist et al.
2021/0006496 A1 * 1/2021 Xiong ................. H04L 67/1008
2021/0089291 A1 * 3/2021 Evans ........................ G06F 8/65
2021/0211486 A1 * 7/2021 Mittal ................... G06F 16/221

FOREIGN PATENT DOCUMENTS

CN 109460220 A 3/2019
CN 110399293 A 11/2019
CN 110716870 A 1/2020
CN 111782452 A 10/2020
CN 112910855 A 6/2021
EP 3 761 560 A1 1/2021
EP 21919026.1 11/2024

OTHER PUBLICATIONS

International Search Report and Written Opinion for International Application No. PCT/CN2021/131669, mailed Feb. 9, 2022.
PCT/CN2021/131669, Feb. 9, 2022, International Search Report and Written Opinion.

* cited by examiner

SAMPLE MESSAGE PROCESSING METHOD AND APPARATUS

This application is a national stage filing under 35 U.S.C. § 371 of International Patent Application Serial No. PCT/CN2021/131669, filed Nov. 19, 2021, which claims priority to Chinese Patent Application No. 202110062659.X, titled "SAMPLE MESSAGE PROCESSING METHOD AND APPARATUS", filed on Jan. 18, 2021 with the China National Intellectual Property Administration. The contents of these applications are incorporated herein by reference in their entireties.

FIELD

The present disclosure relates to the technical field of message processing, and in particular to a method for processing a sample message and a device for processing a sample message.

BACKGROUND

To solve the problems of islands between information systems in an enterprise and isolation of a front-end display and a back-end service of an individual application program, interactions between the information systems and interactions between the front-end display and the back-end service are performed through interfaces according to the conventional technology. Implementation details are shielded. Interface is a common way for data exchange between application programs and for data exchange between information systems. Core services corresponding to an interface include a web service and a RESTful service. For the web service, services are provided through messages in an XML (Extensible Markup Language). The RESTful service is provided based on HTTP (Hypertext Transfer Protocol), resources are represented by using URLs (Uniform Resource Locators), operations on the resources are represented by actions in HTTP, and data is exchanged through messages in a form of JSON (JavaScript Object Notation).

For both the web service and the RESTful service, the core content involved in the interface is data messages. Each interface corresponds to a data packet pair, which includes a request message and a response message. Due to different functions of interfaces, request messages corresponding to different interfaces include different parameter fields, and response messages return different results due to different logics. In order to manage interfaces and perform data exchange through the interfaces, an interface management system may be used to manage data of sample messages called by interfaces. In the interface management system, each interface includes at least one sample message pair (that is, a form of data of sample messages). Each sample message pair represents a processing logic, and includes a sample request message and a sample response message. The sample request message and the sample response message are transmitted following the requirements that are followed by a request message and a response message transmitted through the interface. That is, with the sample request message and the sample response message, as calling samples provided to the user calling the interface, the user may learn the usage of the interface intuitively based on the sample request message and the sample response message.

Parameter fields in the sample request message and the sample response message are constructed and filled by the user. For both the sample request message and the sample response message, it is required for a single parameter field in the messages to reflect a real business logic, so that it is required for a value of a parameter field to conform to actual data. A large amount of actual data is to be constructed manually in writing the sample request message and the sample response message, and multiple parameter fields in any one of the sample request message and the sample response message have association relationships. Therefore, it is required for the user to consider the association relationships between the multiple fields in manually constructing and writing the actual data, resulting in errors in generating the sample request message and the sample response message and reducing the efficiency of developing sample message pairs.

SUMMARY

In view of this, a method for processing a sample message and a device for processing a sample message are provided according to the present disclosure to improve the efficiency of developing sample message pairs.

In an aspect, a method for processing a sample message is provided according to the present disclosure. The method includes: obtaining interface data generated in performing data exchange through an interface; determining additional data corresponding to the interface data, where the additional data indicates an interface to which a sample message pair belongs and a function of the sample message pair; generating, based on the additional data, identification data corresponding to the interface data, where the identification data indicates a request message and a response message corresponding to message version data transmitted through the interface; in a case that the identification data matches historical identification data, determining that the request message and the response message corresponding to the message version data form a historical sample message pair; and in a case that the identification data does not match historical identification data, determining that the request message and the response message corresponding to the message version data form a new sample message pair.

In another aspect, a device for processing a sample message is provided according to the present disclosure. The device includes: an obtaining unit, a determination unit, a generation unit, and a processing unit. The obtaining unit is configured to obtain interface data generated in performing data exchange through an interface. The determination unit is configured to determine additional data corresponding to the interface data, where the additional data indicates an interface to which a sample message pair belongs and a function of the sample message pair. The generation unit is configured to generate, based on the additional data, identification data corresponding to the interface data, where the identification data indicates a request message and a response message corresponding to message version data transmitted through the interface. The processing unit is configured to: determine that the request message and the response message corresponding to the message version data form a historical sample message pair in a case that the identification data matches historical identification data, and determine that the request message and response message corresponding to the message version data form a new sample message pair in a case that the identification data does not match historical identification data.

In another aspect, an electronic device is provided according to the present disclosure. The electronic device includes a processor and a memory. The memory stores instructions executable by the processor. The processor is configured to, when executing the instructions, perform the method for processing a sample message.

In another aspect, a computer storage medium is provided according to the present disclosure A program stored in the computer storage medium, when executed by a processor of an electronic device, causes the electronic device to perform the method for processing a sample message.

With the method for processing a sample message and the device for processing a sample message according to the embodiments, interface data generated in performing data exchange through an interface is obtained, and then additional data corresponding to the interface data is determined. The additional data indicates an interface to which a sample message pair belongs and a function of the sample message pair. Based on the additional data, identification data corresponding to the interface data is generated. The identification data indicates a request message and a response message corresponding to message version data transmitted through the interface. In a case that the identification data matches historical identification data, it is determined that the request message and the response message corresponding to the message version data form a historical sample message pair. In a case that the identification data does not match historical identification data, it is determined that the request message and the response message corresponding to the message version data form a new sample message pair. Thereby, a sample message pair may be formed based on the interface data generated in performing data exchange through an interface. The interface data generated in performing data exchange through the interface is data generated in an actual interaction, and reflects real business logic. In this way, it is unnecessary to manually construct actual data that reflects real business logic, improving the efficiency of developing sample message pairs. In addition, since the interface data generated in performing data exchange through the interface reflects the real business logic, the accuracy of the sample message pairs is improved.

BRIEF DESCRIPTION OF THE DRAWINGS

The above and other features, advantages and aspects of the various embodiments of the present disclosure will become more apparent with reference to the following detailed description in conjunction with the drawings. Throughout the drawings, the same or similar reference numerals denote the same or similar elements. It should be understood that the drawings are schematic and that components and elements are not necessarily drawn to scale.

DETAILED DESCRIPTION

Figure 1:
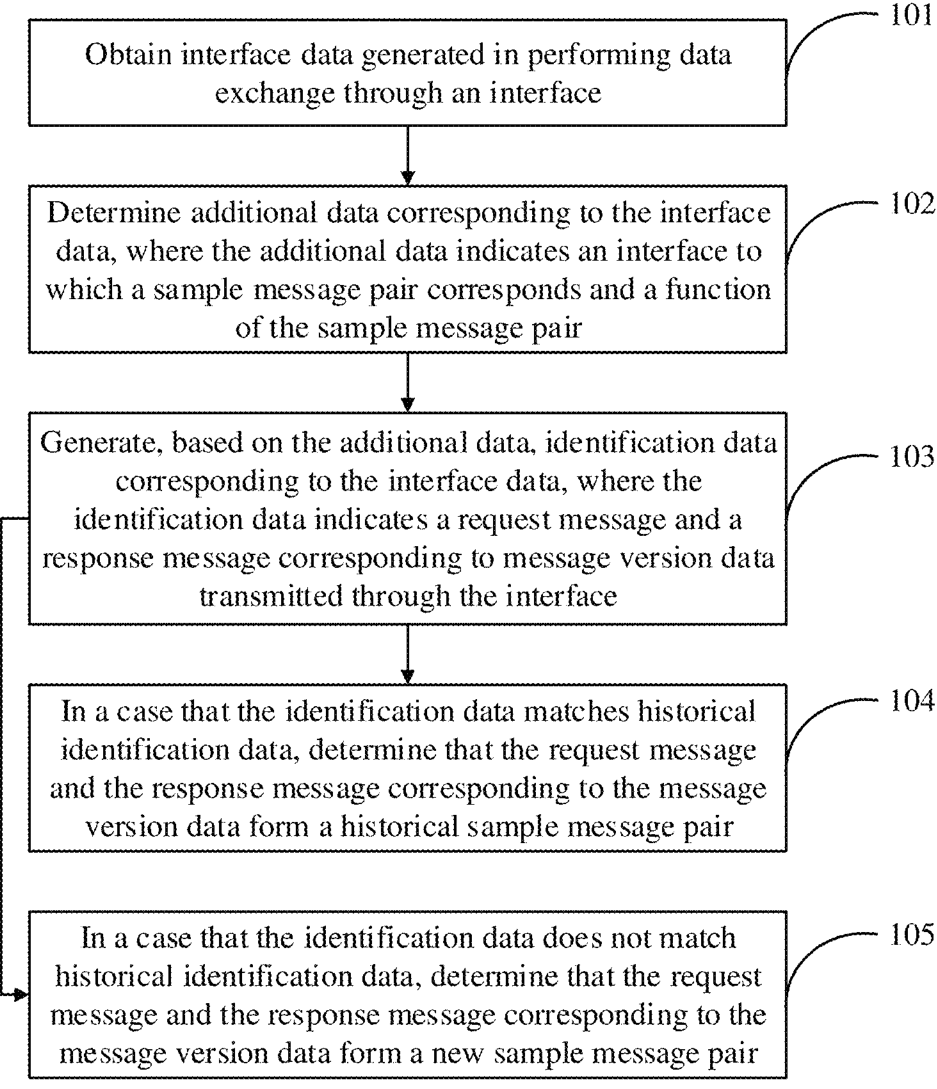
FIG. 1 is a flowchart of a method for processing a sample message according to an embodiment of the present disclosure.

Hereinafter, the embodiments of the present disclosure are described in detail with reference to the drawings. Although some embodiments of the present disclosure are shown in the drawings, it should be understood that the present disclosure may be implemented in various forms and should not be construed as limited to the embodiments set forth herein. The embodiments are provided for thoroughly and completely understanding the present disclosure. It should be understood that the drawings and the embodiments in the present disclosure are only schematic, and are not intended to limit the protection scope of the present disclosure.

The term "including" and variations thereof in the present disclosure means open-ended inclusion, that is, "including but not limited to". The term "based on" means "at least partially based on". The term "one embodiment" means "at least one embodiment". The term "another embodiment" means "at least one another embodiment". The term "some embodiments" means "at least some embodiments". The definitions of other terms are provided in the following descriptions.

It should be noted that the concepts such as "first" and "second" mentioned in the present disclosure are used to distinguish different devices, modules or units, and are not intended to limit an order or interdependence of functions performed by the devices, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

Reference is made to FIG. 1, which shows a flowchart of a method for processing data according to an embodiment of the present disclosure. The method may include the following steps 101 to 105.

In 101, interface data generated in performing data exchange through an interface is obtained.

The interface, as a data exchange way for data exchange between application programs and for data exchange between information systems, may generate interface data for different services in performing data exchange. For example, the interface provide services such as a Web service and a RESTful service, and interface data is generated in providing at least one of the Web service and the RESTful service to an application program or an information system.

The interface data includes at least a request message and a response message. The request message and the response message, as a message pair, are used in performing data exchange through the interface. A message pair corresponds to a function. For example, the web service or the RESTful service is provided by using a message pair. Since different message pairs correspond to different functions, different message pairs have different processing logics and different parameter fields and data values. Therefore, in an embodiment, a function of a message pair may be determined based on, but not limited to, parameter fields and data values in the request message and the response message.

The interface data may be stored, but not limited to, in a log file. Events and messages that occur during operation of an information system, an application program and the like are recorded in the log file. The interface data is a type of data generated during the operation of the information system, the application program and the like, thus the interface data may be stored in the log file. The log file may be stored, but not limited to, in a network interconnection device. For example, the log file may be stored in at least one gateway or may be stored in multiple distributed gateways. The log file may be obtained from multiple gateways, and then the interface data is extracted from the log file.

In 102, additional data corresponding to the interface data is determined. The additional data indicates an interface to which a sample message pair corresponds and a function of the sample message pair. That is, the additional data indicates an interface to which a sample message pair belongs (that is, through which interface sample message pair is exchanged) and the function of the sample message pair, such as a web service or a RESTful service is provided with the sample message pair.

Interface data is generated performing data exchange through an interface. The interface data may include identification information of the interface for indicating an interface to which the request message and the response message correspond. Since different types of request messages and response messages may be exchanged through a same interface, the interface data may further include information for distinguishing the request messages and the response messages. For example, the interface data may further include entrance address information. The entrance address information may be, but is not limited to, address information of a sender corresponding to a request message or a response message. Therefore, the interface data includes at least the identification information of the interface, the entrance address information, the request message, and the response message.

Based on the identification information of the interface, the entrance address information, the request message, and the response message, different types of message pairs are distinguished in different interfaces, and the interfaces to which the message pairs correspond and the functions of the message pairs are indicated. Therefore, in the embodiment, the additional data may be determine based on the identification information of the interface, the entrance address information, the request message, and the response message included in the interface data. The additional data may be determined based on the identification information of the interface, the entrance address information, the request messages, and the response messages included in the interface data in, but not limited to, the following two ways.

In a first way, the identification information of the interface, the entrance address information, the request message, and the response message included in the interface data are determined as the additional data.

In a second way, the identification information of the interface, the entrance address information, the request message and the response message are extracted from the interface data, feature extraction is performed on the request message and the response message to obtain first feature data corresponding to the request message and second feature data corresponding to the response message, message version data is extracted from the response message, and the identification information of the interface, the entrance address information, the first feature data, the second feature data and the message version data are determined as the additional data.

The first feature data, the second feature data and the message version data are used for determining the message pair including the request message and the response message. The message pair corresponds to a function. Message pairs, corresponding to a same interface and having different entrance address information, may correspond to a same function and different versions. Message pairs transmitted through different interfaces may correspond to a same function and a same version, or may correspond to a same function and different versions. In order to distinguish the message pairs, the additional data includes the identification information of the interface for determining an interface to which a message pair corresponds and the entrance address information for determining an entrance.

Figure 2:
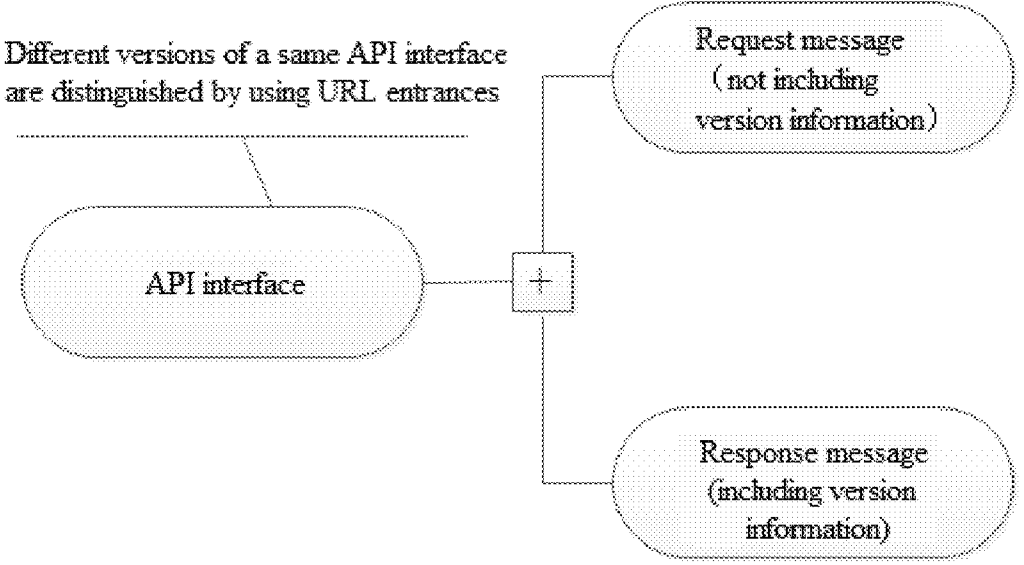
FIG. 2 is a schematic diagram of calling an interface according to an embodiment of the present disclosure.

The request message and the response message form a message pair. The response message includes the message version data for indicating a version of the response message and a version of a request message from a same sender as the response message. For example, the message version data may be, but is not limited to, a version number for indicating the version of the request message and the version of the response message. As shown in FIG. 2, in calling an interface, the request message does not include message version data (such as a version number), and the response message includes message version data. Different versions of a same interface are distinguished by the entrance address information. The entrance address information may be, but is not limited to, a URL (Uniform Resource Locator). An example is provided below to illustrate the reason for including the message version data in the response message.

For example, a service is released in three versions, V1.0, V2.0, and V3.0, the content in the three versions may be different. Taking electronic devices like mobile phones as an example, iPhone 5, iPhone 6, and iPhone 7 are three models of a mobile phone, and the three models may have differences, for example, differences hardware such as processors, screens and chips. Therefore, the three models of mobile phones are considered as three versions of mobile phones. Version switching request may be included in the request message, and correspondingly message version data after switching may be included in the response message.

In 103, identification data corresponding to interface data is generated based on the additional data. The identification data indicates a request message and a response message corresponding to message version data transmitted through the interface.

In an embodiment, the identification data is obtained by using a preset identification generation algorithm based on the additional data. The preset identification generation algorithm is used to generate a hash code. After the additional data is determined, the additional data is processed by using the preset identification generation algorithm to generate a hash code (a form of identification data) of the additional data.

For example, the preset identification generation algorithm may be, but is not limited to, a MD (Message Digest) algorithm. After the additional data is determined, the MD is called to process the additional data to generate a hash code. The additional data may include: the identification information of the interface, the entrance address information, the first feature data, the second feature data, and the message version data. The additional data may include: the identification information of the interface, the entrance address information, the request message, and the response message.

In 104, in a case that the identification data matches historical identification data, it is determined that the request message and the response message corresponding to the message version data form a historical sample message pair.

The historical identification data is obtained before generating current identification data. By determining whether the identification data matches the historical identification data, it is determined whether the request message and the response message currently obtained match a request message and a response message previously obtained. The request message and the response message previously obtained are obtained before a current time instant (at least not earlier than a time instant at which current interface data is obtained and not later than a time instant at which the identification data is generated), indicating that the request message and the response message have been called through the interface before the current time instant. Thus, the historical identification data of the request message and the response message may be obtained before the current time instant.

In the case that the identification data matches the historical identification data, it indicates that the identification data is the same as the historical identification data due to that the identification data is obtained in a same way for the message pair including the request message and the response message. Therefore, in the case that the identification data matches the historical identification data, it indicates that additional data for obtaining the identification data is the same as additional data for obtaining the historical identification data, and data in the interface data corresponding to the additional data for obtaining the identification data is the same as data in interface data corresponding to the additional data for obtaining the historical identification data. Therefore, it is determined that the request message and the response message corresponding to the message version data are the request message and the response message that have been obtained before the current time instant. Thereby, it is determined that the request message and the response message corresponding to the message version data form the historical sample message pair.

In 105, in a case that the identification data does not match historical identification data, it is determined that the request message and the response message corresponding to the message version data form a new sample message pair.

In the case that the identification data does not match the historical identification data, it indicates that the identification data is different from the historical identification data and indicates that the data in the interface data corresponding to the additional data for obtaining the identification data is different from the data in the interface data corresponding to the addition data for obtaining the historical identification data. Therefore, it is determined that the request message and the response message corresponding to the message version data have not been obtained before the current time instant. Thereby, it is determined that the request message and the response message corresponding to the message version data form a new sample message pair.

With the method for processing a sample message according to the embodiments, interface data generated in performing data exchange through an interface is obtained, and then additional data corresponding to the interface data is determined. The additional data indicates an interface to which a sample message pair belongs and a function of the sample message pair. Based on the additional data, identification data corresponding to the interface data is generated. The identification data indicates a request message and a response message corresponding to message version data transmitted through the interface. In a case that the identification data matches historical identification data, it is determined that the request message and the response message corresponding to the message version data form a historical sample message pair. In a case that the identification data does not match historical identification data, it is determined that the request message and the response message corresponding to the message version data form a new sample message pair. Thereby, a sample message pair may be formed based on the interface data generated in performing data exchange through an interface. The interface data generated in performing data exchange through the interface is data generated in an actual interaction, and reflects real business logic. In this way, it is unnecessary to manually construct actual data that reflects real business logic, improving the efficiency of developing sample message pairs. In addition, since the interface data generated in performing data exchange through the interface reflects the real business logic, the accuracy of the sample message pairs is improved.

Figure 3:
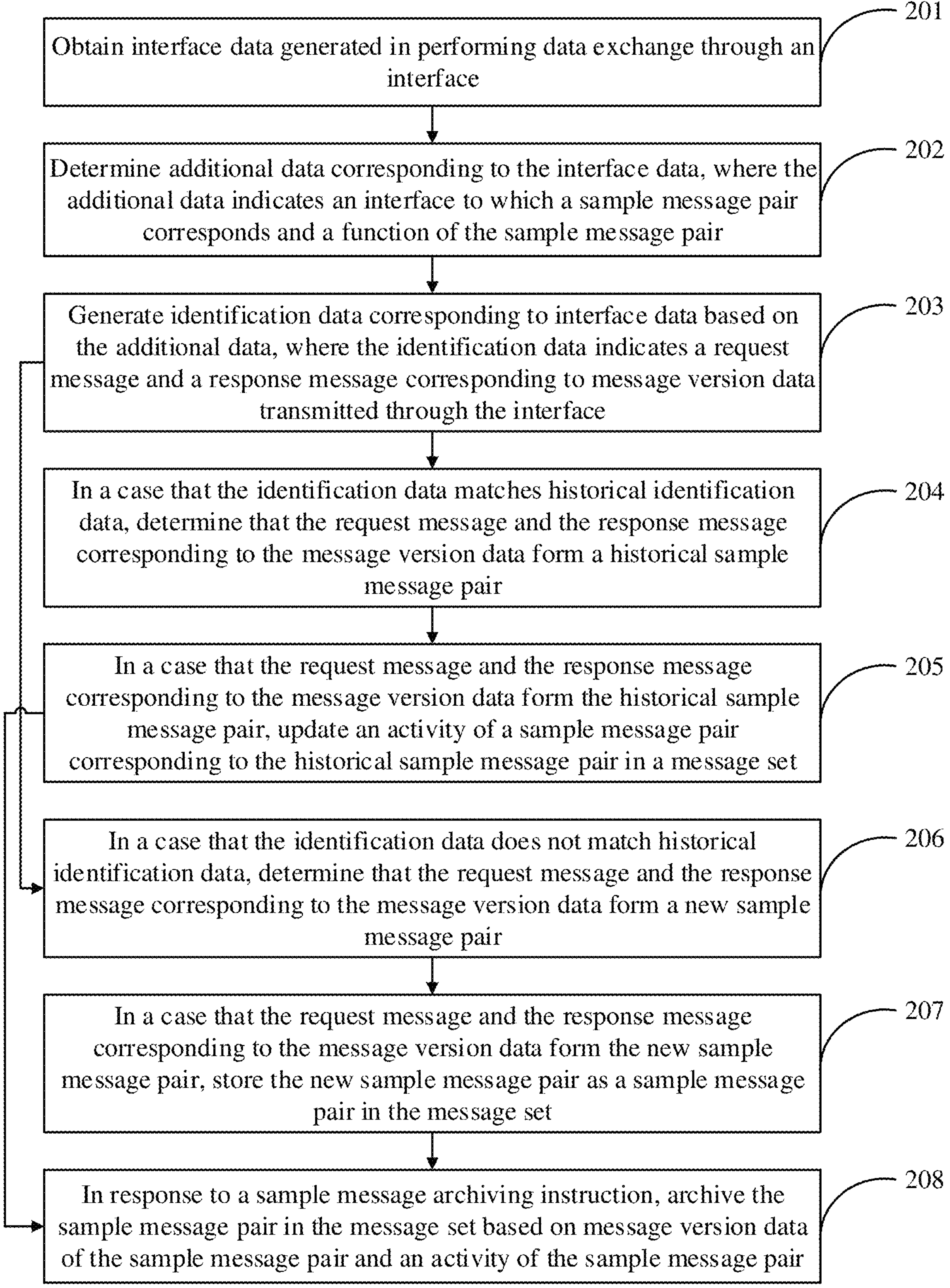
FIG. 3 is a flowchart of a method for processing a sample message according to another embodiment of the present disclosure.

Reference is made to FIG. 3, which shows a flowchart of a method for processing a sample message according to another embodiment of the present disclosure. The method may include the following steps 201 to 208.

In 201, interface data generated in performing data exchange through an interface is obtained.

In 202, additional data corresponding to the interface data is determined. The additional data indicates an interface to which a sample message pair corresponds and a function of the sample message pair. That is, the additional data indicates an interface to which a sample message pair belongs (that is, through which interface sample message pair is exchanged) and the function of the sample message pair, such as a web service or a RESTful service is provided with the sample message pair.

In 203, identification data corresponding to interface data is generated based on the additional data. The identification data indicates a request message and a response message corresponding to message version data transmitted through the interface.

In 204, in a case that the identification data matches historical identification data, it is determined that the request message and the response message corresponding to the message version data form a historical sample message pair.

In 205, in a case that the request message and the response message corresponding to the message version data form the historical sample message pair, an activity of a sample message pair corresponding to the historical sample message pair in a message set is updated.

The request message and the response message in the interface data, and the generated identification data are correspondingly stored in the message set, so that a piece of identification data indicates a pair of request message and response message. The request message and the response message stored in the message set form a sample message pair. Identification data corresponding to the sample message pair is historical identification data.

After obtaining identification data of a piece of interface data, the identification data is compared with the historical identification data included in the message set to determine whether the identification data matches the historical identification data in the message set. In a case that the identification data matches the historical identification data in the message set, it indicates that the request message currently obtained is the same as a historical request message corresponding to the historical identification data and the response message currently obtained is the same as a historical response message corresponding to the historical identification data. Therefore, it is determined that the request message and the response message currently obtained corresponding to the message version data form a historical sample message pair, and an activity of a sample message pair corresponding to the historical sample message pair in the message set is updated.

The activity of the sample message pair indicates whether the sample message pair is valid in a preset time period. For example, the activity indicates whether the sample message pair is still in use in the preset time period and indicates a use degree of the sample message pair. The preset time period may be, but is not limited to, relative to the current time instant. Taking the current time instant as an end time instant, a start time instant is obtained by pushing forward from the current time instant by the preset time period. It is determined whether the sample message pair is still in use and the use degree of the sample message pair in the preset time period from the start time instant to the end time instant.

In an embodiment, the activity of the sample message pair may be represented by, but not limited to, a number. After determining that the request message and the response message corresponding to the message version data form a historical sample message pair, the activity of the sample message pair corresponding to the historical sample message pair in the message set is increased, for example, the activity is increased by one. A higher activity indicates a higher usage degree, and a lower activity indicates a lower usage degree. After determining that the request message and the response message corresponding to the message version data form a historical sample message pair, it indicates that the historical sample message pair has been stored in the message set, the currently obtained request message and response message may not be stored in the message set, reducing the number of message pairs in the message set.

In 206, in a case that the identification data does not match historical identification data, it is determined that the request message and the response message corresponding to the message version data form a new sample message pair.

In 207, in a case that the request message and the response message corresponding to the message version data form the new sample message pair, the new sample message pair is stored as a sample message pair in the message set.

In the case that the request message and the response message corresponding to the message version data form the new sample message pair, it indicates that the new sample message pair has not been stored in the message set. In this case, the new sample message pair is stored as a sample message pair in the message set, and the identification data of the new sample message pair may be stored in the message set for comparison and matching after obtaining the identification data.

In 208, in response to a sample message archiving instruction, the sample message pair in the message set is archived based on message version data of the sample message pair and an activity of the sample message pair.

It should be understood that the sample message archiving instruction is transmitted for archiving a sample message pair in the message set. In an embodiment, the archiving the sample message may be processed as a scheduled task. The scheduled task may be performed at a preset time interval to perform archiving. Correspondingly, a response to the sample message archiving instruction is triggered at the preset time interval. Therefore, a response to the sample message archiving instruction is triggered when a current time instant reaches a preset archiving time instant. Apparently, the sample message archiving instruction may be triggered in other ways. For example, the sample message archiving instruction may be triggered in a case that a device for performing the method for processing a sample message operates in an idle time period. The idle time period may be determined by, but not limited to, the performance of the device, such as a processor usage and a memory usage.

In response to the sample message archiving instruction, a valid sample message pair and an invalid sample message pair may be determined based on message version data of the sample message pair in the message set and an activity of the sample message pair in the message set by: in a case that a current time instant reaches a preset time archiving time instant, triggering the sample message archiving instruction; obtaining the message version data of the sample message pair in the message set; in a case that the message version data of the sample message pair indicates that the sample message pair is a latest sample message pair, determining the latest sample message pair as a valid sample message pair; in a case that the message version data of the sample message pair indicates that the sample message pair is not a latest sample message pair, obtaining the activity of the sample message pair; in a case that the activity of the sample message pair indicates an increase in the activity of the sample message pair in a preset time period before the current time instant, determining the sample message pair as a valid sample message pair; and in a case that the activity of the sample message pair indicates no increase in the activity of the sample message pair in a preset time range before the current time instant, determining the sample message pair as an invalid sample message pair.

The latest sample message pair may be considered as a latest version of the sample message pair. Compared to the latest sample message pair, there is no sample message pair with a newer version. Similarly, for an application program having versions 1.0, 2.0 and 4.0, the application program with version 4.0 is the latest application program, and each of the application programs with the other versions is not the latest application program.

In the case that the message version data of the sample message pair indicates that the sample message pair is the latest sample message pair, it indicates that the sample message pair is a sample message pair with a latest version, then the sample message pair is directly determined as a valid sample message pair. For a sample message pair not having the latest version, determination is performed based on the activity of the sample message. For a valid sample message pair, it indicates that the sample message pair is still in use. Then, the valid sample message pair may be maintained in a valid state for future use. For an invalid sample message pair, it indicates that the sample message pair may no longer be used. Then, the invalid sample message pair may be controlled to be in an invalid state to indicate that the invalid sample message pair may be deleted.

With the method for processing a sample message described above, in response to the sample message archiving instruction, the sample message pair in the message set is archived based on the message version data and the activity of the sample message pair in the message set, performing automatic classification on the sample message pair in the message set rather than manual classification, and thereby improving the processing efficiency.

Figure 4:
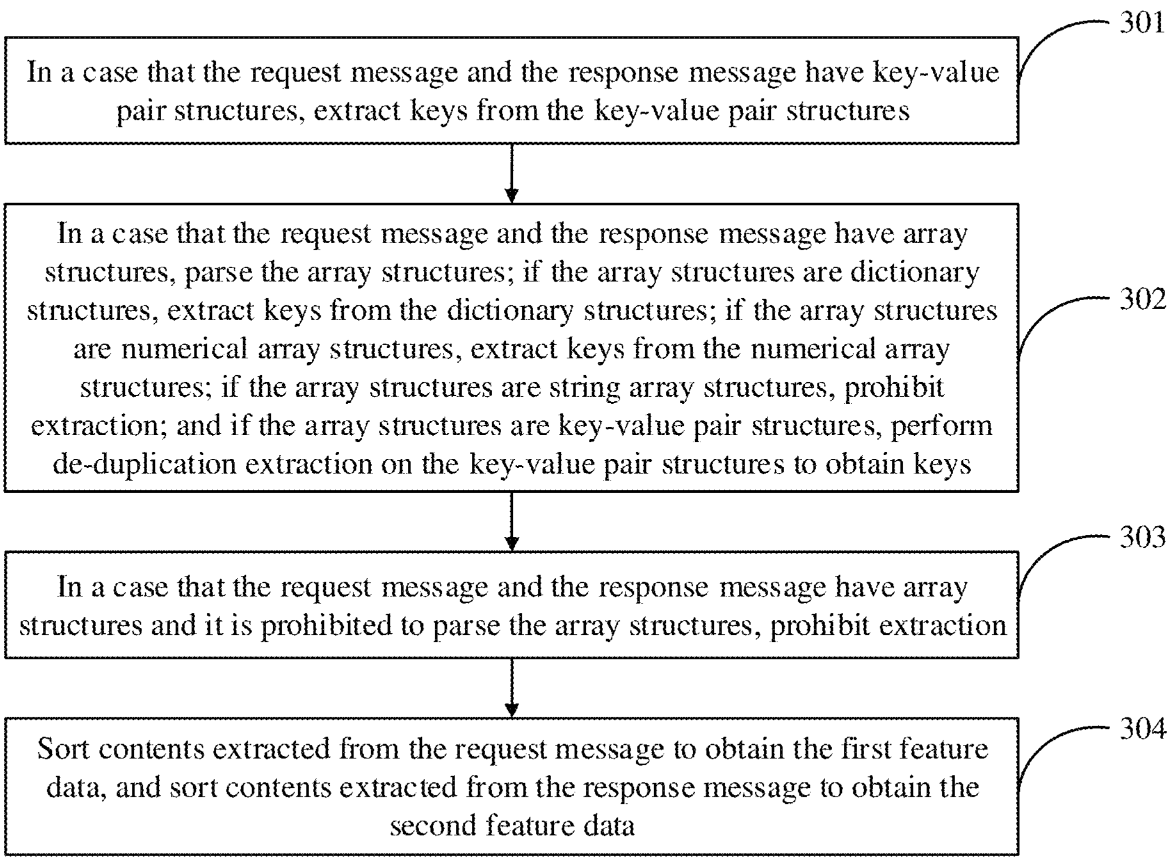
FIG. 4 is a flowchart of extracting feature data according to an embodiment of the present disclosure.

In an embodiment, a process of performing feature extraction on the request message and the response message is as shown in FIG. 4. The process may include the following steps 301 to 304.

In 301, in a case that the request message and the response message have key-value pair structures, keys are extracted from the key-value pair structures. A key-value pair structure is represented by {key: value}, in which "key" represents a key and "value" represents a value, then the key "key" is extracted.

In 302, in a case that the request message and the response message have array structures, the array structures are parsed. If the array structures are dictionary structures, keys are extracted from the dictionary structures. If the array structures are numerical array structures, keys are extracted from the numerical array structures. If the array structures are string array structures, extraction is prohibited. If the array structures are key-value pair structures, de-duplication extraction is performed on the key-value pair structures to obtain keys.

It may be determined whether the request message and the response message have array structures based on a value of processSwitch in interface metadata. In a case that the value of processSwitch is true, it is determined to parse the array structures. In a case that the value of processSwitch is false, it is determined not to parse the array structures.

A dictionary structure is represented by {key: [{key1: value, key2: vlue2} ] }, in which "key" represents a key and [{key1: value, key2: vlue2} ] represents a value, then the key "key" is extracted from the dictionary structure. For example, a numerical array structure may be represented by {key: [1234,1215]}, in which "key" represents a key and [1234, 1215] represents a numerical array, then the key "key" in the numerical array structure is extracted and the numerical array is ignored. For example, a string array structure may be represented by {key: ["aac", "sdef"] }, in which "key" represents a key and ["aac", "sdef"] represents a string array, then it is prohibited to extract the string array. A key-value pair structure is represented by {key: ["key1": value, "key2": value] }, then de-duplication is performed on the key in the key-value pair structure and the key after de-duplication is extracted.

In 303, in a case that the request message and the response message have array structures and it is prohibited to parse the array structures, extraction is prohibited.

In 304, contents extracted from the request message are sorted to obtain the first feature data, and contents extracted from the response message are sorted to obtain the second feature data. Due to features of a JSON message, content in the request message and content the response messages may be inverted. For example, the content in one message is {a: 1, b: 2, c: 3} and the content in another message is {c: 3, a: 1, b: 2}, it can be seen that the contents in the two messages are the same and there is an inversion (that is, the contents in the two messages have different sequences). In view of this, it is required to perform sorting on the request message and the response message according to the embodiment to ensure the consistency of the contents of the messages. After performing sorting, de-duplication may be performed on the messages to prevent the messages from having same contents.

In the feature extraction described above, different processing is performed on messages having different message structures to automatically extract the content of the request message and the content of the response message, then feature data of the request message and feature data of the response message are obtained, thereby automatically extracting the feature data.

The flowcharts shown in the drawings show system architecture, functions and operations which may be implemented by the system, method and computer program product according to the embodiments of the present disclosure. Each block in the flowcharts or the block diagram may represent a part of a module, a program section or codes including executable instructions for implementing specified logic functions. It should be noted that, in an alternative embodiment, functions denoted in the blocks may be performed in an order different from the order denoted in the drawing. For example, operations in two blocks connected successively may be performed in parallel, or may be performed in an opposite order, depending on involved functions. It should be noted that, each block in the block diagrams and/or flowcharts, and a combination of blocks in the block diagrams and/or flowcharts may be implemented by a dedicated hardware system for performing specified functions or operations, or may be implemented by a combination of dedicated hardware and computer instructions.

Although the operations are described in a specific order, the operations are unnecessarily to be performed in the specific order or in a chronological order. In a certain environment, a multi-task and parallel processing may be beneficial.

It should be understood that the various steps described in the method embodiments of the present disclosure may be performed in different orders, and/or performed in parallel. Additionally, method embodiments may include additional steps and/or illustrated steps may be not performed. The scope of the present disclosure is not limited in this regard.

Computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as a standalone software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

Figure 5:
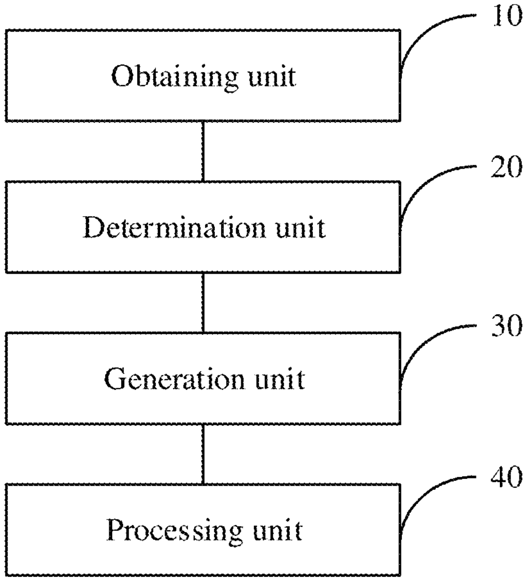
FIG. 5 is a schematic structural diagram of a device for processing a sample message according to an embodiment of the present disclosure.

Corresponding to the method embodiments, a device for processing a sample message is further provided according to an embodiment of the present disclosure. FIG. 5 shows a structure of the device according to an embodiment. The device may include an obtaining unit 10, a determination unit 20, a generation unit 30, and a processing unit 40.

The obtaining unit 10 is configured to obtain interface data generated in performing data exchange through an interface. The interface data includes at least a request message and a response message. The request message and the response message, as a message pair, are used in performing data exchange through the interface. A message pair corresponds to a function. For example, the web service or the RESTful service is provided by using a message pair. Since different message pairs correspond to different functions, different message pairs have different processing logics and different parameter fields and data values. Therefore, in an embodiment, a function of a message pair may be determined based on, but not limited to, parameter fields and data values in the request message and the response message. Reference may be made to the method embodiments for detailed illustration.

The determination unit 20 is configured to determine additional data corresponding to the interface data. The additional data indicates an interface to which a sample message pair corresponds and a function of the sample message pair. That is, the additional data indicates an interface to which a sample message pair belongs (that is, through which interface sample message pair is exchanged) and the function of the sample message pair, such as a web service or a RESTful service is provided with the sample message pair.

In an embodiment, the interface data includes at least identification information of the interface, entrance address information, the request message, and the response message. The additional data may be determined in, but not limited to, the following two ways.

In a first way, the identification information of the interface, the entrance address information, the request message, and the response message included in the interface data are determined as the additional data.

In a second way, the identification information of the interface, the entrance address information, the request message and the response message are extracted from the interface data, feature extraction is performed on the request message and the response message to obtain first feature data corresponding to the request message and second feature data corresponding to the response message, message version data is extracted from the response message, and the identification information of the interface, the entrance address information, the first feature data, the second feature data and the message version data are determined as the additional data.

The first feature data, the second feature data and the message version data are used for determining the message pair including the request message and the response message. The message pair corresponds to a function. Message pairs, corresponding to a same interface and having different entrance address information, may correspond to a same function and different versions. Message pairs transmitted through different interfaces may correspond to a same function and a same version, or may correspond to a same function and different versions. In order to distinguish the message pairs, the additional data includes the identification information of the interface for determining an interface to which a message pair corresponds and the entrance address information for determining an entrance.

Feature extraction is performed on the request message and the response message to obtain the first feature data corresponding to the request message and the second feature data corresponding to the response message by: in a case that the request message and the response message have key-value pair structures, extracting keys from the key-value pair structure s; in a case that the request message and the response message have array structures, parsing the array structures, and if the array structures are dictionary structures, extracting keys from the dictionary structures, if the array structures are numerical array structures, extracting keys from the numerical array structures, if the array structures are string array structures, prohibiting extraction, and if the array structures are key-value pair structures, performing de-duplication extraction on the key-value pair structures to obtain keys; in a case that the request message and the response message have array structures and it is prohibited to parse the array structures, prohibiting extraction; and sorting contents extracted from the request message to obtain the first feature data, and sorting contents extracted from the response message to obtain the second feature data.

The generation unit 30 is configured to generate identification data corresponding to interface data based on the additional data. The identification data indicates a request message and a response message corresponding to message version data transmitted through the interface.

In an embodiment, the identification data is obtained by using a preset identification generation algorithm based on the additional data. The preset identification generation algorithm is used to generate a hash code. After the additional data is determined, the additional data is processed by using the preset identification generation algorithm to generate a hash code (a form of identification data) of the additional data.

The processing unit 40 is configured to: determine that the request message and the response message corresponding to the message version data form a historical sample message pair in a case that the identification data matches historical identification data, and determine that the request message and response message corresponding to the message version data form a new sample message pair in a case that the identification data does not match historical identification data.

The historical identification data is obtained before generating current identification data. By determining whether the identification data matches the historical identification data, it is determined whether the request message and the response message currently obtained match a request message and a response message previously obtained. The request message and the response message previously obtained are obtained before a current time instant (at least not earlier than a time instant at which current interface data is obtained and not later than a time instant at which the identification data is generated), indicating that the request message and the response message have been called through the interface before the current time instant. Thus, the historical identification data of the request message and the response message may be obtained before the current time instant.

In the case that the identification data matches the historical identification data, it indicates that the identification data is the same as the historical identification data due to that the identification data is obtained in a same way for the message pair including the request message and the response message. Therefore, in the case that the identification data matches the historical identification data, it indicates that additional data for obtaining the identification data is the same as additional data for obtaining the historical identification data, and data in the interface data corresponding to the additional data for obtaining the identification data is the same as data in interface data corresponding to the additional data for obtaining the historical identification data. Therefore, it is determined that the request message and the response message corresponding to the message version data are the request message and the response message that have been obtained before the current time instant. Thereby, it is determined that the request message and the response message corresponding to the message version data form the historical sample message pair.

In the case that the identification data does not match the historical identification data, it indicates that the identification data is different from the historical identification data and indicates that the data in the interface data corresponding to the additional data for obtaining the identification data is different from the data in the interface data corresponding to the addition data for obtaining the historical identification data. Therefore, it is determined that the request message and the response message corresponding to the message version data have not been obtained before the current time instant. Thereby, it is determined that the request message and the response message corresponding to the message version data form a new sample message pair.

With the device for processing a sample message according to the embodiments, interface data generated in performing data exchange through an interface is obtained, and then additional data corresponding to the interface data is determined. The additional data indicates an interface to which a sample message pair belongs and a function of the sample message pair. Based on the additional data, identification data corresponding to the interface data is generated. The identification data indicates a request message and a response message corresponding to message version data transmitted through the interface. In a case that the identification data matches historical identification data, it is determined that the request message and the response message corresponding to the message version data form a historical sample message pair. In a case that the identification data does not match historical identification data, it is determined that the request message and the response message corresponding to the message version data form a new sample message pair. Thereby, a sample message pair may be formed based on the interface data generated in performing data exchange through an interface. The interface data generated in performing data exchange through the interface is data generated in an actual interaction, and reflects real business logic. In this way, it is unnecessary to manually construct actual data that reflects real business logic, improving the efficiency of developing sample message pairs. In addition, since the interface data generated in performing data exchange through the interface reflects the real business logic, the accuracy of the sample message pairs is improved.

Figure 6:
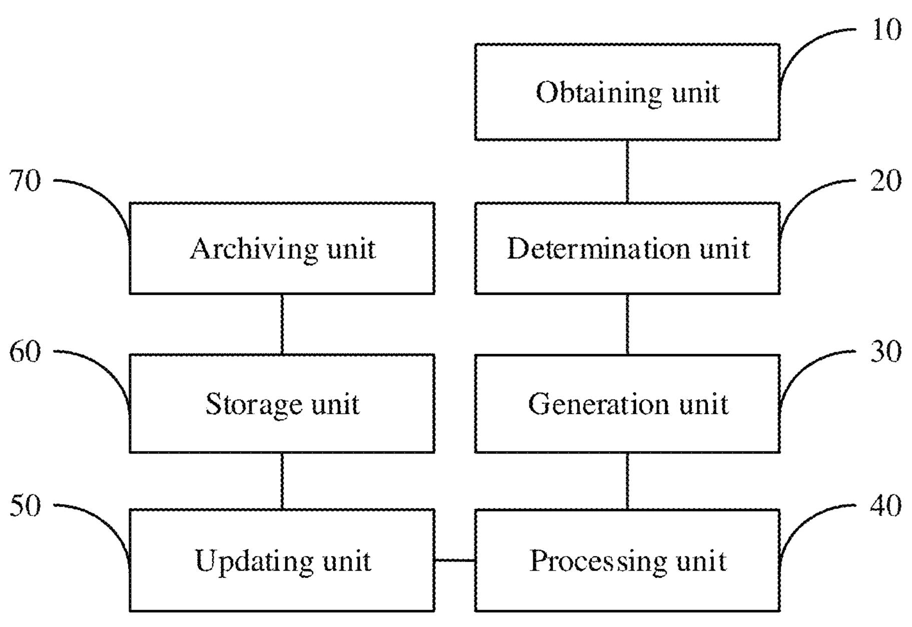
FIG. 6 is a schematic structural diagram of a device for processing a sample message according to another embodiment of the present disclosure.

Reference is made to FIG. 6, which shows a structure of a device for processing a sample message according to another embodiment of the present disclosure. The device may further include an updating unit 50, a storage unit 60, and an archiving unit 70.

The updating unit 50 is configured to, in a case that the request message and the response message corresponding to the message version data is the historical sample message pair, update an activity of a sample message pair corresponding to the historical sample message pair in a message set. The request message and the response message in the interface data, and the generated identification data are correspondingly stored in the message set, so that a piece of identification data indicates a pair of request message and response message. The request message and the response message stored in the message set form a sample message pair. Identification data corresponding to the sample message pair is historical identification data.

The activity of the sample message pair indicates whether the sample message pair is valid in a preset time period. For example, the activity indicates whether the sample message pair is still in use in the preset time period and indicates a use degree of the sample message pair. The preset time period may be, but is not limited to, relative to the current time instant. Taking the current time instant as an end time instant, a start time instant is obtained by pushing forward from the current time instant by the preset time period. It is determined whether the sample message pair is still in use and the use degree of the sample message pair in the preset time period from the start time instant to the end time instant.

In an embodiment, the activity of the sample message pair may be represented by, but not limited to, a number. After determining that the request message and the response message corresponding to the message version data form a historical sample message pair, the activity of the sample message pair corresponding to the historical sample message pair in the message set is increased, for example, the activity is increased by one. A higher activity indicates a higher usage degree, and a lower activity indicates a lower usage degree. After determining that the request message and the response message corresponding to the message version data form a historical sample message pair, it indicates that the historical sample message pair has been stored in the message set, the currently obtained request message and response message may not be stored in the message set, reducing the number of message pairs in the message set.

The storage unit 60 is configured to, in a case that the request message and the response message corresponding to the message version data is the new sample message pair, store the new sample message pair as a sample message pair in the message set. In the case that the request message and the response message corresponding to the message version data form the new sample message pair, it indicates that the new sample message pair has not been stored in the message set. In this case, the new sample message pair is stored as a sample message pair in the message set, and the identification data of the new sample message pair may be stored in the message set for comparison and matching after obtaining the identification data.

The archiving unit 70 is configured to, in response to a sample message archiving instruction, archive the sample message pair in the message set based on message version data of the sample message pair and an activity of the sample message pair.

It should be understood that the sample message archiving instruction is transmitted for archiving a sample message pair in the message set. In an embodiment, the archiving the sample message may be processed as a scheduled task. The scheduled task may be performed at a preset time interval to perform archiving. Correspondingly, a response to the sample message archiving instruction is triggered at the preset time interval. Therefore, a response to the sample message archiving instruction is triggered when a current time instant reaches a preset archiving time instant. Apparently, the sample message archiving instruction may be triggered in other ways. For example, the sample message archiving instruction may be triggered in a case that a device for performing the method for processing a sample message operates in an idle time period. The idle time period may be determined by, but not limited to, the performance of the device, such as a processor usage and a memory usage.

The archiving unit 70 may be configured to, in response to the sample message archiving instruction, determine a valid sample message pair and an invalid sample message pair based on message version data of the sample message pair in the message set and an activity of the sample message pair in the message set by: in a case that a current time instant reaches a preset time archiving time instant, triggering the sample message archiving instruction; obtaining the message version data of the sample message pair in the message set; in a case that the message version data of the sample message pair indicates that the sample message pair is a latest sample message pair, determining the latest sample message pair as a valid sample message pair; in a case that the message version data of the sample message pair indicates that the sample message pair is not a latest sample message pair, obtaining the activity of the sample message pair; in a case that the activity of the sample message pair indicates an increase in the activity of the sample message pair in a preset time period before the current time instant, determining the sample message pair as a valid sample message pair; and in a case that the activity of the sample message pair indicates no increase in the activity of the sample message pair in a preset time range before the current time instant, determining the sample message pair as an invalid sample message pair.

With the device for processing a sample message described above, in response to the sample message archiving instruction, the sample message pair in the message set is archived based on the message version data and the activity of the sample message pair in the message set, performing automatic classification on the sample message pair in the message set rather than manual classification, and thereby improving the processing efficiency.

Units involved in the embodiments of the present disclosure may be implemented by software or hardware. Names of the modules do not limit the modules in a certain case. For example, a first determination unit may be described as "a unit configured to determine a quantity of data which belongs to the to-be-processed dataset and is not added to an existing cluster after a first clustering control unit indicates that a clustering of the to-be-processed dataset is finished".

The functions described above may be performed at least partially by one or more hardware logical components. For example, without limitation, exemplary types of hardware logic components that may be adopted include: a field programmable gate array (FPGA), an application specific integrated circuit (ASIC), an application specific standard product (ASSP), a system on chip (SOC), a complex programmable logic device (CPLD), and the like.

Figure 7:
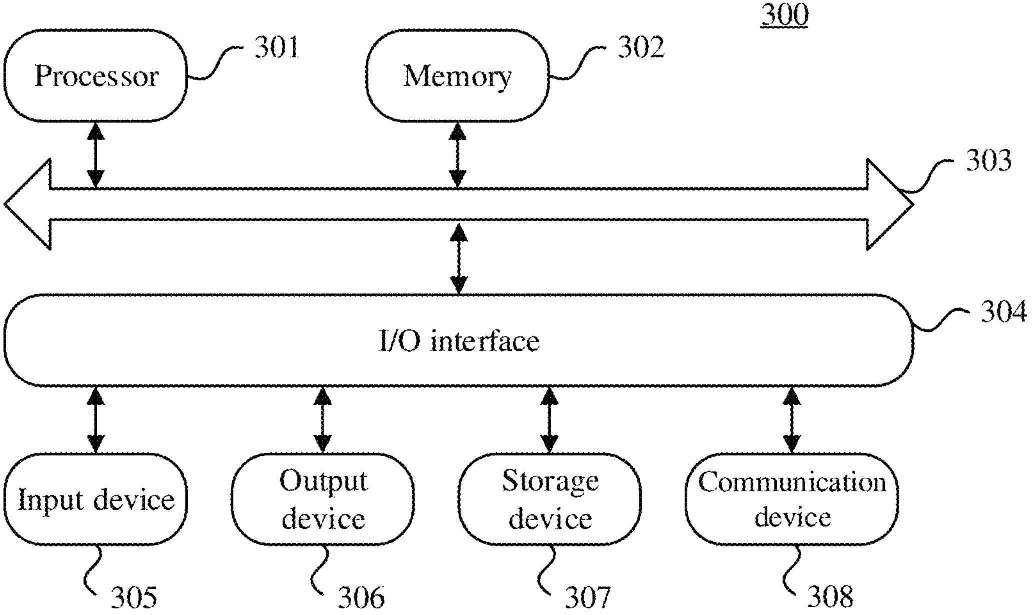
FIG. 7 is a schematic structural diagram of an electronic device according to an embodiment of the present disclosure.

Reference is made to FIG. 7, which shows a schematic structural diagram of an electronic device 300 for implementing the embodiments of the present disclosure. The electronic device in the embodiments of the present disclosure may include but not limited to mobile terminals such as a mobile phone, a notebook computer, a digital broadcast receiver, a personal digital assistance (PDA), and a tablet computer (PAD); and fixed terminals such as a desktop computer. The electronic device shown in FIG. 7 is schematic, and is not intended to limit functions and scope of the embodiments of the present disclosure.

As shown in FIG. 7, the electronic device 300 may include a processor (such as a central processor and a graphic processor) 301. The processor may perform the method for processing a sample message by executing executable instructions stored in a memory 302. The memory 302 may be, but is not limited to, at least one of a read-only memory (ROM) and a random access memory (RAM). The processor 301 and the memory 302 may be connected to each other through a bus 303 to communicate with each other via the bus 303. The electronic device 300 may further include an input/output (I/O) interface 304. The input/output (I/O) interface 304 is connected to the bus 604.

Generally, the following components are connected to the I/O interface 304: an input device 305 such as a touch screen, a touch panel, a keyboard, a mouse, a camera, a microphone, an accelerometer, and gyroscope; an output device 306 such as a liquid crystal display (LCD), a loudspeaker and a vibrator; a storage device 307 such as a magnetic tape and a hard disk; and a communication device 308. The communication device 308 may allow the electronic device 300 to communicate with other devices in a wired or wireless manner to exchange data. Although FIG. 7 shows the electronic device provided with various apparatuses, it should be understood that not all shown apparatuses are necessary. Alternatively, more or less apparatuses may be included.

A computer storage medium is further provided according to an embodiment of the present disclosure. A program stored in the computer storage medium, when executed by a processor of an electronic device, causes the electronic device to perform the method for processing a sample message.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. More specific examples of the computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any combination thereof.

In the present disclosure, the computer readable storage medium may be a tangible medium including or storing programs. The programs may be used by, or in combination with, an instruction execution system, apparatus or device. In the present disclosure, a computer readable signal medium may include a data signal propagated in a baseband or as a part of carrier. The computer readable signal medium carries computer readable program codes. The propagated data signal may include but not limited to an electromagnetic signal, an optical signal or any combination thereof. The computer readable signal medium may be any computer readable medium other than the computer readable storage medium. The computer readable signal medium may send, propagate or transmit programs to be used by or in combination with the instruction execution system, apparatus or device. The program code included in the computer readable medium may be transmitted via any appropriate medium, including but not limited to an electric wire, an optical fiber, radio frequency (RF) or any appropriate combination thereof.

The computer readable medium may be included in the electronic device described above, or may exist independently and is not installed in the electronic device.

According to the embodiments of the present disclosure, processes described with reference to the flowcharts may be implemented as computer software programs. For example, according to an embodiment of the present disclosure, a computer program product including computer program carried on a non-transitory computer readable medium is provided. The computer program includes program codes for performing the method shown in the flowchart. In such embodiment, the computer program may be downloaded and installed from the network through a communication apparatus, or installed from a memory. The computer program, when executed by a processor, to perform functions defined in the methods described in the embodiments of the present disclosure.

According to one or more embodiments of the present disclosure, a method for processing a sample message is provided. The method includes: obtaining interface data generated in performing data exchange through an interface; determining additional data corresponding to the interface data, where the additional data indicates an interface to which a sample message pair corresponds and a function of the sample message pair; generating, based on the additional data, identification data corresponding to the interface data, where the identification data indicates a request message and a response message corresponding to message version data transmitted through the interface; in a case that the identification data matches historical identification data, determining that the request message and the response message corresponding to the message version data form a historical sample message pair; and in a case that the identification data does not match historical identification data, determining that the request message and the response message corresponding to the message version data form a new sample message pair.

According to one or more embodiments of the present disclosure, the method further includes: in a case that the request message and the response message corresponding to the message version data form the historical sample message pair, updating an activity of a sample message pair corresponding to the historical sample message pair in a message set; in a case that the request message and the response message corresponding to the message version data form the new sample message pair, storing the new sample message pair as a sample message pair in the message set; and in response to a sample message archiving instruction, archiving the sample message pair in the message set based on message version data of the sample message pair and an activity of the sample message pair.

According to one or more embodiments of the present disclosure, the in response to a sample message archiving instruction, archiving the sample message pair in the message set based on message version data of the sample message pair and an activity of the sample message pair includes: in a case that a current time instant reaches a preset time archiving time instant, triggering the sample message archiving instruction; obtaining the message version data of the sample message pair in the message set; in a case that the message version data of the sample message pair indicates that the sample message pair is a latest sample message pair, determining the latest sample message pair as a valid sample message pair; in a case that the message version data of the sample message pair indicates that the sample message pair is not a latest sample message pair, obtaining the activity of the sample message pair; in a case that the activity of the sample message pair indicates an increase in the activity of the sample message pair in a preset time period before the current time instant, determining the sample message pair as a valid sample message pair; and in a case that the activity of the sample message pair indicates no increase in the activity of the sample message pair in a preset time range before the current time instant, determining the sample message pair as an invalid sample message pair.

According to one or more embodiments of the present disclosure, the determining additional data corresponding to the interface data includes: extracting, from the interface data, identification information of the interface, entrance address information, a request message, and a response message; performing feature extraction on the request message and the response message to obtain first feature data corresponding to the request message and second feature data corresponding to the response message; extracting message version data from the response message; and determining the identification information of the interface, the entrance address information, the first feature data, the second feature data, and the message version data as the additional data.

According to one or more embodiments of the present disclosure, the generating, based on the additional data, identification data corresponding to the interface data includes: generating a hash code based on the identification information of the interface, the entrance address information, the first feature data, the second feature data, and the message version data.

According to one or more embodiments of the present disclosure, the performing feature extraction on the request message and the response message to obtain first feature data corresponding to the request message and second feature data corresponding to the response message includes: in a case that the request message and the response message have key-value pair structures, extracting keys from the key-value pair structure s; in a case that the request message and the response message have array structures, parsing the array structures, and if the array structures are dictionary structures, extracting keys from the dictionary structures, if the array structures are numerical array structures, extracting keys from the numerical array structures, if the array structures are string array structures, prohibiting extraction, and if the array structures are key-value pair structures, performing de-duplication extraction on the key-value pair structures to obtain keys; in a case that the request message and the response message have array structures and it is prohibited to parse the array structures, prohibiting extraction; and sorting contents extracted from the request message to obtain the first feature data, and sorting contents extracted from the response message to obtain the second feature data.

A device for processing a sample message is further provided according to an embodiment of the present disclosure. The device includes: an obtaining unit, a determination unit, a generation unit, and a processing unit. The obtaining unit is configured to obtain interface data generated in performing data exchange through an interface. The determination unit is configured to determine additional data corresponding to the interface data, where the additional data indicates an interface to which a sample message pair belongs and a function of the sample message pair. The generation unit is configured to generate, based on the additional data, identification data corresponding to the interface data, where the identification data indicates a request message and a response message corresponding to message version data transmitted through the interface. The processing unit is configured to: determine that the request message and the response message corresponding to the message version data form a historical sample message pair in a case that the identification data matches historical identification data, and determine that the request message and response message corresponding to the message version data form a new sample message pair in a case that the identification data does not match historical identification data.

According to one or more embodiments of the present disclosure, the device further includes: an updating unit, a storage unit, and an archiving unit. The updating unit is configured to, in a case that the request message and the response message corresponding to the message version data is the historical sample message pair, update an activity of a sample message pair corresponding to the historical sample message pair in a message set. The storage unit is configured to, in a case that the request message and the response message corresponding to the message version data is the new sample message pair, store the new sample message pair as a sample message pair in the message set. The archiving unit is configured to, in response to a sample message archiving instruction, archive the sample message pair in the message set based on message version data of the sample message pair and an activity of the sample message pair.

According to one or more embodiments of the present disclosure, the archiving unit is configured to: in a case that a current time instant reaches a preset time archiving time instant, trigger the sample message archiving instruction; obtain the message version data of the sample message pair in the message set; in a case that the message version data of the sample message pair indicates that the sample message pair is a latest sample message pair, determine the latest sample message pair as a valid sample message pair; in a case that the message version data of the sample message pair indicates that the sample message pair is not a latest sample message pair, obtain the activity of the sample message pair; in a case that the activity of the sample message pair indicates an increase in the activity of the sample message pair in a preset time period before the current time instant, determine the sample message pair as a valid sample message pair; and in a case that the activity of the sample message pair indicates no increase in the activity of the sample message pair in a preset time range before the current time instant, determine the sample message pair as an invalid sample message pair.

According to one or more embodiments of the present disclosure, the determination unit is configured to: extract, from the interface data, identification information of the interface, entrance address information, a request message, and a response message; perform feature extraction on the request message and the response message to obtain first feature data corresponding to the request message and second feature data corresponding to the response message; extract message version data from the response message; and determine the identification information of the interface, the entrance address information, the first feature data, the second feature data, and the message version data as the additional data.

According to one or more embodiments of the present disclosure, the generation unit is configured to: generate a hash code based on the identification information of the interface, the entrance address information, the first feature data, the second feature data, and the message version data.

According to one or more embodiments of the present disclosure, the determination unit is configured to obtain the first feature data corresponding to the request message and the second feature data corresponding to the response message by: in a case that the request message and the response message have key-value pair structures, extracting keys from the key-value pair structure s; in a case that the request message and the response message have array structures, parsing the array structures, and if the array structures are dictionary structures, extracting keys from the dictionary structures, if the array structures are numerical array structures, extracting keys from the numerical array structures, if the array structures are string array structures, prohibiting extraction, and if the array structures are key-value pair structures, performing de-duplication extraction on the key-value pair structures to obtain keys; in a case that the request message and the response message have array structures and it is prohibited to parse the array structures, prohibiting extraction; and sorting contents extracted from the request message to obtain the first feature data, and sorting contents extracted from the response message to obtain the second feature data.

An electronic device is further provided according to an embodiment of the present disclosure. The electronic device includes a processor and a memory. The memory stores instructions executable by the processor. The processor is configured to, when executing the instructions, perform the method for processing a sample message as described above.

A computer storage medium is further provided according to an embodiment of the present disclosure. A program stored in the computer storage medium, when executed by a processor of an electronic device, causes the electronic device to perform the method for processing a sample message as described above.

The subject matter is described by language specific to the structure feature and/or method logic, it should be understood that the subject matter defined in the appended claims is not necessarily limited to the specific features or actions described above. The specific features and actions are merely schematic implementations of the claims.

Although specific details are described above, the details should not be understood as restriction to the scope of the present disclosure. Some features described in the context of different embodiments may be combined in one embodiment. Alternatively, the features described in the context of one embodiment may be implemented in multiple embodiments independently or in any appropriate sub-combination.

The preferred embodiments and the technical principles of the present disclosure are described above. It should be understood by those skilled in the art that the protection scope of the present disclosure is not limited to the technical solutions formed by specific combination of the above technical features. Other technical solutions formed by combinations of the above technical features or equivalent features without departing from the concept of the present disclosure shall fall within the protection scope of the present disclosure. For example, the technical solution formed by replacement between the above technical features and technical features with similar functions disclosed (not limited) in the present disclosure also falls within the protection scope of the present disclosure.

The invention claimed is:

1. A method for processing a sample message, comprising:

obtaining interface data generated in performing data exchange through an interface;

determining additional data corresponding to the interface data, wherein the additional data indicates an interface to which a sample message pair corresponds and a function of the sample message pair;

generating, based on the additional data, identification data corresponding to the interface data, wherein the identification data indicates a request message and a response message corresponding to message version data transmitted through the interface;

determining that the request message and the response message corresponding to the message version data form a historical sample message pair, in a case that the identification data matches historical identification data;

determining that the request message and the response message corresponding to the message version data form a new sample message pair, in a case that the identification data does not match historical identification data;

updating an activity of a sample message pair corresponding to the historical sample message pair in a message set, in a case that the request message and the response message corresponding to the message version data form the historical sample message pair;

storing the new sample message pair as a sample message pair in the message set, in a case that the request message and the response message corresponding to the message version data form the new sample message pair; and in response to a sample message archiving instruction, archiving the sample message pair in the message set based on message version data of the sample message pair and an activity of the sample message pair;

wherein the in response to a sample message archiving instruction, archiving the sample message pair in the message set based on message version data of the sample message pair and an activity of the sample message pair comprises:

in a case that a current time instant reaches a preset time archiving time instant, triggering the sample message archiving instruction;

obtaining the message version data of the sample message pair in the message set;

in a case that the message version data of the sample message pair indicates that the sample message pair is a latest sample message pair, determining the latest sample message pair as a valid sample message pair;

in a case that the message version data of the sample message pair indicates that the sample message pair is not a latest sample message pair, obtaining the activity of the sample message pair;

in a case that the activity of the sample message pair indicates an increase in the activity of the sample message pair in a preset time period before the current time instant, determining the sample message pair as a valid sample message pair; and in a case that the activity of the sample message pair indicates no increase in the activity of the sample message pair in a preset time range before the current time instant, determining the sample message pair as an invalid sample message pair.

2. The method according to claim 1, wherein the determining additional data corresponding to the interface data comprises:

extracting, from the interface data, identification information of the interface, entrance address information, a request message, and a response message;

performing feature extraction on the request message and the response message to obtain first feature data corresponding to the request message and second feature data corresponding to the response message;

extracting message version data from the response message; and determining the identification information of the interface, the entrance address information, the first feature data, the second feature data, and the message version data as the additional data.

3. The method according to claim 2, wherein the generating, based on the additional data, identification data corresponding to the interface data comprises:

generating a hash code based on the identification information of the interface, the entrance address information, the first feature data, the second feature data, and the message version data.

4. The method according to claim 2, wherein the performing feature extraction on the request message and the response message to obtain first feature data corresponding to the request message and second feature data corresponding to the response message comprises:

in a case that the request message and the response message have key-value pair structures, extracting keys from the key-value pair structures;

in a case that the request message and the response message have array structures, parsing the array structures, and if the array structures are dictionary structures, extracting keys from the dictionary structures, if the array structures are numerical array structures, extracting keys from the numerical array structures, if the array structures are string array structures, prohibiting extraction, and if the array structures are key-value pair structures, performing de-duplication extraction on the key-value pair structures to obtain keys;

in a case that the request message and the response message have array structures and it is prohibited to parse the array structures, prohibiting extraction; and sorting contents extracted from the request message to obtain the first feature data, and sorting contents extracted from the response message to obtain the second feature data.

5. An electronic device, comprising:

a processor; and a memory storing instructions executed by the processor;

wherein the processor is configured to, when executing the instructions, perform the method for processing a sample message according to claim 1.

6. A non-transitory computer storage medium, wherein a program stored in the non-transitory computer storage medium, when executed by a processor of an electronic device, causes the electronic device to perform the method for processing a sample message according to claim 1.

* * * * *